May 19, 1953  J. T. CLARK  2,638,896
SPRING STRUCTURE
Filed July 10, 1948

Inventor
John T. Clark
by Parker & Carter
Attorneys.

Patented May 19, 1953

2,638,896

UNITED STATES PATENT OFFICE 2,638,896

SPRING STRUCTURE

John T. Clark, Cicero, Ill.

Application July 10, 1948, Serial No. 38,034

6 Claims. (Cl. 128—127)

This invention relates to a diaphragm structure and particularly to a spring structure for use in connection therewith. It has for one object to provide a spring of sufficient strength and of such nature that the spring will bend freely in one direction and will resist bending in another direction.

Another object is to provide a spring structure primarily for use in diaphragms of such nature that it can expand and contract generally freely but will resist twisting or bending out of its main plane.

Other objects will appear from time to time throughout the specification and claims.

This invention is illustrated more or less diagrammatically in the accompanying drawings, wherein.

Like parts are indicated by like characters throughout the specification and the drawings.

Figure 3:
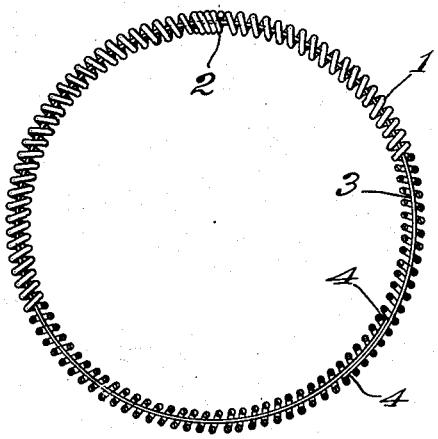
Figure 3 is a plan view of the spring structure removed from the diaphragm, with parts broken away and parts in section.
Figure 4:
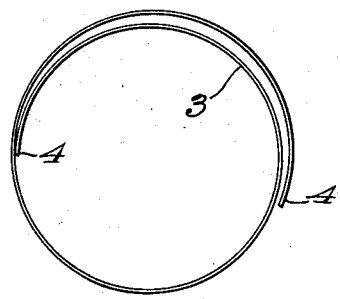
Figure 4 is a plan view of one member of the spring structure.
Figure 5:
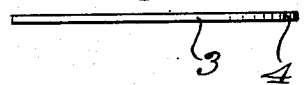
Figure 5 is a side elevation of Figure 4.

In the particular form here shown the spring structure comprises a coil spring 1 which is originally made as a straight spring and is finally secured end to end, as at 2. Freely within the coil spring 1 is positioned a flat spring 3. As shown in Figure 3, the spring is of general circular plan, and its ends 4, 4 overlap each other. It is biased to expand to the position shown in Figures 3, 4 and 5, but since its ends are not secured together, it may be compressed to a generally circular shape of less diameter than that shown.

In use the spring is embodied in a diaphragm which includes a member 5 of rubber like material. This member is provided with an integral tubular enlargement 6. This enlargement encloses the spring structure, as shown generally in Figure 1 and in detail in Figure 6.

In manufacture the spring 3 is formed and is biased to assume the position shown. It is inserted into a coil spring and the coil spring is then arranged in the position of Figure 5, and its ends are secured together. They may be secured together by any means.

As shown the convolutions of one end of the coil spring are threaded or fitted into the convolutions of the opposite end of the coil spring, and thus a spring structure is produced which includes a coil spring arranged in circular plan and which includes a flat spring freely positioned within it. This structure is embodied in the completed diaphragm and the rubber or rubber-like material of the diaphragm may be applied by molding, or otherwise.

Figure 1:
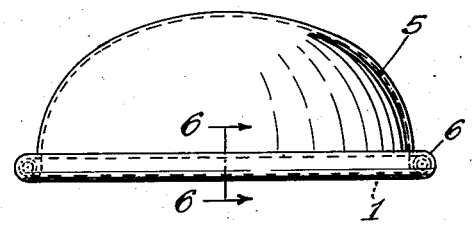
Figure 1 is a side elevation of one form of the device embodied in a diaphragm.
Figure 2:
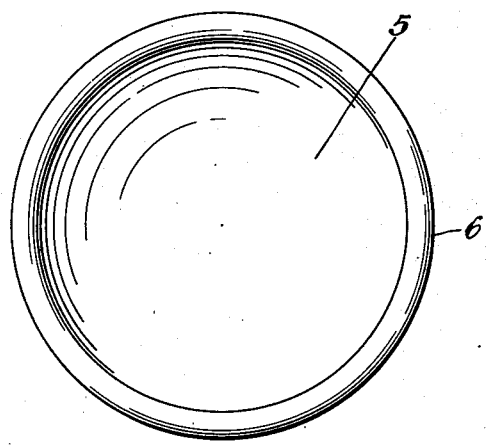
Figure 2 is a plan view of the diaphragm.
Figure 6:
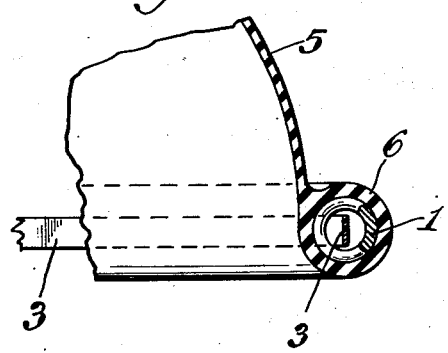
Figure 6 is a sectional detail taken on an enlarged scale at line 6—6 of Figure 1.

In use the diaphragm may be distorted. It may, for example, by means of a suitable tool, be elongated to assume a more or less elliptical shape. The springs permit this change in shape readily, and when the tool is removed the springs are biased to resume the circular plan of the drawings. The flat spring resists bending or twisting which would carry it out of its main plane. Thus, although contraction or expansion of the spring structure is freely possible because of the design and construction of the two springs, twisting or bending which would tend to distort the spring structure out of its flat position and form as shown particularly in Figures 1 and 6 is resisted by the flat spring which is flexible only for expansion and contraction and not for bending or distortion out of the plane in which it is biased to lie.

Although I have shown an operative form of my invention, it will be recognized that many changes in the form, shape and arrangement of parts can be made without departing from the spirit of the invention, and my showing is therefore to be taken as, in a sense, diagrammatic. Where the expressions "spring structure" or "composite spring structure" occur they are to be taken as meaning the combination of the coil spring 1 and the flat spring 3.

I claim:

1. In combination a composite spring structure comprising a member generally flexible in all directions and a member flexible in only one direction, said first member comprising a coil spring, said second member comprising a flat spring arranged in generally circular plan with overlapping, freely movable ends within said coil spring, said spring structure being combined with a body of rubber-like material enclosing said spring structure.

2. In combination a composite spring structure comprising a member generally flexible in all directions and a member flexible in only one direction, said first member comprising a coil spring, said second member comprising a flat spring arranged in generally circular plan with overlapping, freely movable ends within said coil spring, said spring structure being combined with a body of rubber-like material enclosing said spring structure, and an integral diaphragm extending across the space bounded by said spring structure.

3. In combination a composite spring structure comprising a member generally flexible in all directions and a member flexible in only one direction, said first member comprising a coil spring, said second member comprising a flat spring arranged in generally circular plan within said coil spring and having overlapping, freely movable ends, said spring structure being combined with a body of rubber-like material enclosing said spring structure.

4. In combination a composite spring structure comprising a member generally flexible in all directions and a member flexible in only one direction, said first member comprising an endless coil spring, said second member comprising a single flat spring arranged loosely in generally circular plan within said coil spring for free expansion and contraction, and a body of rubber-like material enclosing said spring structure.

5. In combination a composite spring structure comprising a member generally flexible in all directions and a member flexible in only one direction, said first member comprising an endless coil spring, said second member comprising a single flat spring arranged in generally circular plan loosely within said coil spring for free expansion and contraction and having overlapping ends, and a body of rubber-like material enclosing said spring structure.

6. A composite spring structure comprising a member generally flexible in all directions and a member flexible in only one direction, said first member comprising an endless coil spring, and said second member comprising a flat spring arranged in generally circular plan having free, overlapping ends positioned freely within said coil spring, and arranged for free expansion and contraction.

JOHN T. CLARK.

References Cited in the file of this patent

UNITED STATES PATENTS

| Number | Name | Date |
| --- | --- | --- |
| 178,458 | Otto | June 6, 1876 |
| 202,037 | Lockwood | Apr. 2, 1878 |
| 647,003 | Kuznik | Apr. 10, 1900 |
| 2,463,356 | Clark | Mar. 1, 1949 |
| 2,529,363 | Ballard | Nov. 7, 1950 |
| 2,538,478 | Snell | Jan. 16, 1951 |

FOREIGN PATENTS

| Number | Country | Date |
| --- | --- | --- |
| 283,792 | Italy | Mar. 23, 1931 |
| 557,914 | Germany | Aug. 28, 1931 |